United States Patent [19]

Jackson

[11] 4,012,602
[45] Mar. 15, 1977

[54] TOLL RESTRICTOR FOR TOUCH TYPE DIGIT SELECTOR

[75] Inventor: Joseph Monroe Jackson, Menlo Park, Calif.

[73] Assignee: Litton Business Telephone Systems, Inc., Sunnyvale, Calif.

[22] Filed: Mar. 14, 1975

[21] Appl. No.: 558,302

[52] U.S. Cl. .......................... 179/90 D; 179/18 DA
[51] Int. Cl.² ........................................ H04M 1/66
[58] Field of Search ........ 179/90 D, 18 DA, 189 D, 179/6.3 R

[56] References Cited

UNITED STATES PATENTS

| | | | |
|---|---|---|---|
| 3,681,536 | 8/1972 | Pask et al. | 179/18 DA |
| 3,727,007 | 4/1973 | Catlin | 179/18 DA |
| 3,757,055 | 9/1973 | McCann et al. | 179/90 D |
| 3,899,640 | 8/1975 | Piacente et al. | 179/18 DA |

Primary Examiner—Kathleen H. Claffy
Assistant Examiner—Gerald L. Brigance
Attorney, Agent, or Firm—Ronald M. Goldman

[57] ABSTRACT

Means and methods are disclosed to prevent dialing of long distance telephone calls from a restricted local substation by counting the number of digits dialed at that station and preventing the sending of further digits once the count attains a predetermined number. Means are also included by which the initial dialing of the digit zero, which might enable one to obtain access to the long distance telephone operator, also results in disabling of the telephone dial. The invention includes a pair of Nand gate latches and an electronic shift register; means responsive to the telephone substation being placed in the off-hook or on-hook condition, respectively, for setting the Nand gate latches in a second or first bi-stable condition, respectively; means responsive to the first Nand gate latch going into the first bi-stable condition for inserting an information bit into the shift register; means responsive to the first shift in the register for setting the first Nand gate to its first condition and means responsive to the information bit being shifted into an eighth position for setting both Nand gate latches into the first condition; and means for disabling transmission when the second Nand gate latch is in the first condition.

1 Claim, 1 Drawing Figure

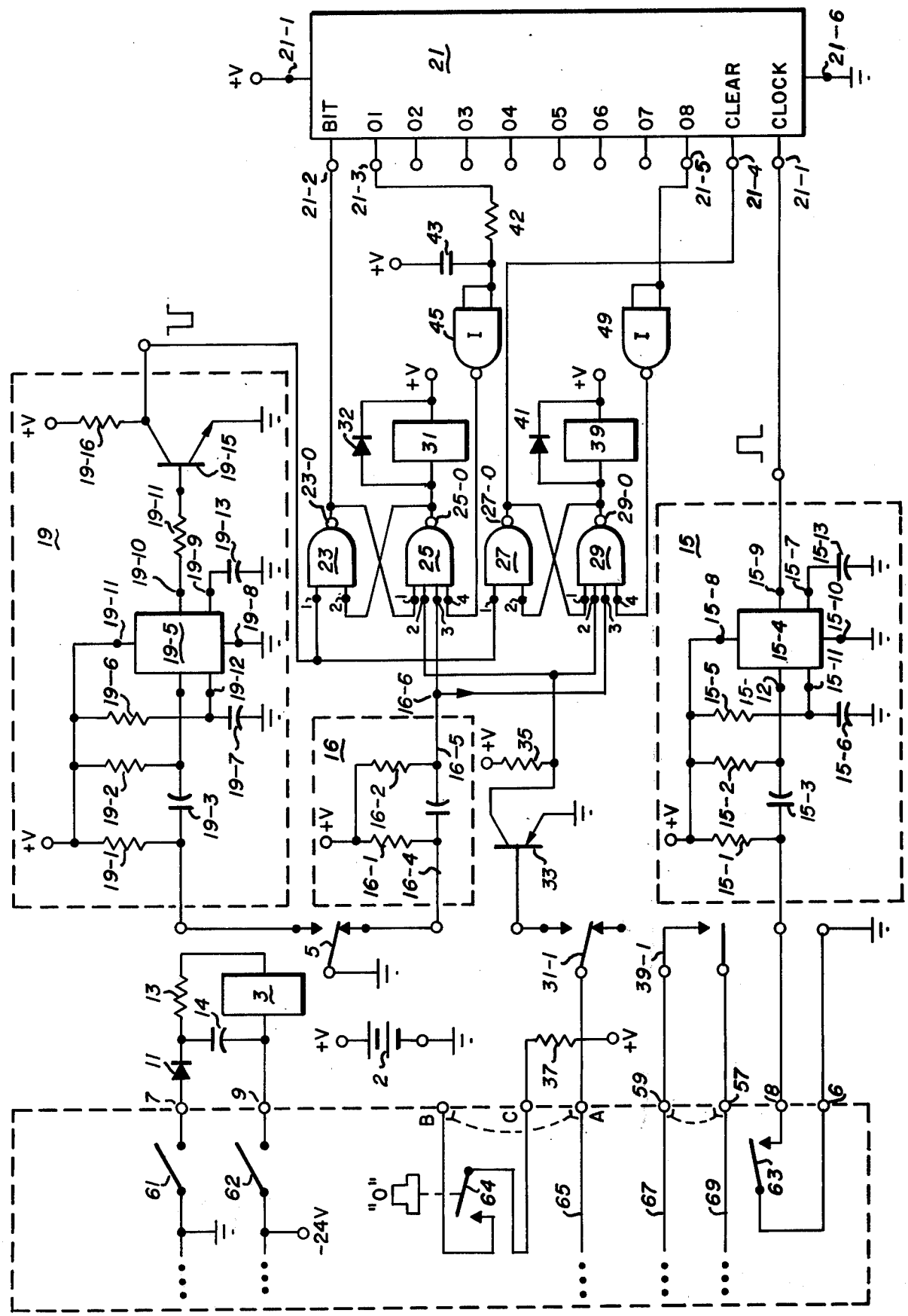

TOLL RESTRICTOR FOR TOUCH TYPE DIGIT SELECTOR

BACKGROUND OF THE INVENTION

1. Field of the Invention

This invention relates to toll restricting telephone apparatus and, more particularly, to an attachment apparatus and method for preventing long distance telephone calls from being placed from a local restricted telephone set.

2. Description of the Prior Art.

It has heretofore been known to provide toll restriction circuits on various telephones in a telephone system so as to prevent the use of those telephones for long distance telephone calls for obvious reasons of economy. In the prior art system of which I have knowledge, restrictive equipment was maintained at the central station which received the full information on the called number, determined whether the called number was a long distance call, and determined whether the telephone station from which the call was placed is authorized to make such long distance calls and when that determination was negative the line was disabled and the call was not completed. Currently many users install private automatic branch exchanges (PABX) which they interconnect to telephone company lines. Ideally it is desired to restrict some of the telephone stations within the PABX system from initiating off-premises long distance telephone calls without disturbing the other substations therein or without requiring the installation of expensive circuitry of the aforementioned type frequency found in central stations. Toll restricting devices for the foregoing application have been made known to me in U.S. Pat. No. 3,727,007 to Catlin, granted Apr. 10, 1973, and in U.S. Pat. No. 3,757,055 to McCann, granted Sept. 4, 1973. In each of the toll restrictors disclosed in the aforecited patents means are provided to terminate the placement of the telephone call if the number of digits dialed exceeds that necessary for a local call or if the initial digit or digits dialed represents an attempt to reach a long distance telephone operator. The present invention is directed to a similar type of toll restricting apparatus.

SUMMARY OF THE INVENTION

In accordance with an object of restricting individual telephone substations from successfully making long distance telephone calls a means and method is devised for preventing selected substations on an individual basis from placing long distance telephone calls. Suitably means are connected in circuit with the restricted telephone set which counts the number of digits being sent by the calling party. When the number of digits dialed exceeds the minimum number required to place a local telephone call, which is indicative of the placement of a long distance telephone call, means responsive to such an excess count disables the telephone dial circuit and further digits cannot be dialed and sent over the trunk line. Additional means are included to detect the initial dialing of the digit zero as the first digit of the called number to thus detect an attempt to reach the telephone operator and, in response to the detection of same, the telephone dial circuit is disabled.

In a specific aspect of the invention there is included a pair of Nand gate latches, an electronic shift register, means responsive to the telephone set going off-hook or on-hook, respectively, for setting the Nand gate latches in the second or first bi-stable condition, means responsive to the first Nand gate latch going into the first condition for inserting an information bit in the register, means responsive to each operation of the station digit selecting means for pulsing the clock input of the shift register to shift the position of an inserted information bit, means responsive to the first shift of an information bit for setting the first Nand gate to its first condition and means responsive to said information bit being shifted into an eighth position counting eight digits for setting both said first and second Nand gate latches into their first condition and means for disabling transmission from the digit selecting means when the second Nand gate latch is in its first condition.

The foregoing and other objects and structure characteristic of my invention as well as modifications and improvements thereto becomes more apparent to one skilled in the art upon giving consideration to the detailed description of a preferred embodiment of the invention which follows, taken together with the FIGURE of the drawing illustrating the embodiment in a schematic form understood by those skilled in the art.

DESCRIPTION OF THE PREFERRED EMBODIMENTS

The toll restrictor of the invention includes a relay having a winding 3 and a set of transfer contacts 5. The winding or relay 3, a diode 11 and a resistor 13, are connected in series circuit as shown between input terminals 7 and 9. A capacitor 14 is connected from one side of the relay winding to one side of the resistor. A source of DC voltage 2, symbolically illustrated as a battery, has a positive polarity terminal connected to terminal identified as "+V" and has its negative polarity terminal connected to circuit "ground". Connections to the source 2 are represented simply by the symbol +V at various parts of the figures, and the circuit ground is similarly indicated by the conventional symbol.

Input terminals 6 ad 8 are connected, respectively, to the circuit ground and to the input of a pulse generating circuit 15, represented in the dash lines. The pulse generating circuit is of any conventional structure having the function of receiving an input signal, such as a voltage pulse, that may be of unpredictable level or duration, and provides an output signal of a desired or "standard" pulse shape. As illustrated within the dashed lines, one specific circuit includes a differentiating circuit consisting of resistors 15-1, 15-2, and a capacitor 15-3. The capacitor is in series circuit between input terminal 8 and input terminal 15-1 of a pulse generator device 15-4. One end of each resistor is connected on opposite sides of capacitor 15-3 and the remaining end of the resistors are connected to source +V. Pulse generator 15-4 represents a conventional semiconductor element known as a "one-shot trigger", such as the Model 555 available from the Signetics Company of Sunnyvale, California. Suitably the device is biased electrically in a conventional manner by means of resistor 15-5 connected to input 15-11, capacitor 15-6 connected between input 15-11 and ground. A capacitor 15-13 is connected between input 15-7 and ground, and is connected to source +V at input 15-8, a ground connection at 15-10, and an output terminal 15-9.

Reference is again made to transfer contact set 5 of relay 3. The break contact therein is connected in circuit to a pulse shaping circuit represented by dash lines 16. Suitably pulse shaping circuit 16 includes a differentiating circuit consisting of resistors 16-1 and 16-2 and a series capacitor 16-3 between its input 16-4 and output 16-5. The resistors are connected between opposite sides of the capacitor and source +V as shown.

The make contact of transfer contact set 5 is connected to another pulse generating circuit 19, represented in the dash lines. The pulse generating circuit 19 is of conventional structure and receives a signal applied to the make contact and transforms the signal into a voltage pulse of a predetermined shape, i.e. proper pulse height and duration or width at the output. As is apparent from the figure, the particular pulse generating circuit is in great part similar in construction to the aforedescribed pulse shaping circuit 15 but includes, in addition, an inverter employing a transistor. Thus, the pulse generating circuit includes a differentiating circuit consisting of resistors 19-1, 19-2 and a series capacitor 19-3 is connected to input 19-4 of a one-shot trigger device, 19-5, of conventional structure. Additional resistors 19-6 and capacitor 19-7 are series connected with the mid-point serving to bias another input 19-12 of the "one-shot". Suitably the one-shot is connected to the source of voltage +V via lead 19-11 and to circuit ground via lead 19-8. A third input 19-9 is connected to capacitor 19-13.

Transistor 19-15, suitably an NPN type, includes an emitter, collector and base electrodes. The output 19-10 of the one-shot is connected via resistor 19-14 to the base of transistor 19-15. The collector of transistor 19-15 is connected via resistor 19-16 to the source +V and the emitter of transistor 19-15 is connected to circuit ground.

The output of the pulse generating circuit is connected to and taken from the collector of transistor 19-15.

An 8-bit electronic shift register 21, symbolically illustrated, is of conventional structure, suitably by way of example, a conventional semiconductor TTL type construction obtained from the Signetics Company, Signetics Model 74164. The shift register includes an input 21-1 for a "clock" signal input, a bit input terminal 21-2, a second position output 21-3, a clear input 21-4 and an eighth position output 21-5 which are explained in greater detail hereafter.

Also symbolically illustrated is a pair of Nand gates, 23 and 25, of conventional structure connected together to form a "latching" circuit. A second pair of Nand gates 27 and 29 are also connected together in a "latch" circuit. Nand gate 23 includes input terminals 23-1, 23-2, and an output 23-4. Nand gate 25 includes four input terminals 25-1, 25-2, 25-3, 25-4, and an output terminal 25-5. As is apparent from the schematic drawing of the figure, output 23-4 is connected to input 25-1, input 23-2 is connected to output 25-5, Nand gate 27 includes two input terminals 27-1, 27-2, and an output terminal 27-3. Nand gate 29 includes four input terminals, 29-1, 29-2, 29-3 and 29-4. Input 27-2 is connected to output 29-5 and output 27-3 is connected to input 29-1. The output of the pulse generating circuit 19 is connected in parallel to input 23-1 of Nand gate 23 and to input gate 27-1 of Nand gate 27.

A resistor 35 is connected at one end to the source +V and is connected in parallel to inputs 25-2 and 29-1. Conventionally a Nand gate is an electronic logic circuit element and operates as an electronic switch to provide an output of a high voltage, voltage high or "high" when all of its inputs have applied a high and if any one input is at a low voltage, voltage low or "low" the output remains at low.

The output 16-6 of pulse shaping circuit 16 is connected in parallel to inputs 29-3 and 25-3.

Output 25-0 is connected in an electrical series circuit with the winding of a relay 31, suitably an electromechanical type relay, to the source of voltage +V. A diode 32, poled as shown, is connected in shunt with the relay winding.

Relay 31 includes a transfer contact set 31-1. The make contact of that set is connected to the base electrode of a transistor 33. Transistor 33 suitably is an NPN type and includes a base, emitter and collector. The collector of transistor 33 is connected to resistor 35 at the end connected to the inputs of Nand gates 25 and 29, and the emitter is connected to circuit ground.

The transfer contact of contact set 31-1 is connected in circuit to a terminal A and the break contact is connected in circuit to a terminal B.

The source of voltage +V is connected through a high value resistor 37 to an input terminal C.

Another electromechanical type relay 39 is connected in series between output 29-0 of Nand gate 29 and the source +V. A diode 41, poled as shown, is connected in shunt of the relay winding to shunt voltage transients. Relay 39 includes a make contact set 39-1 located on the left side of the figure. One of the contacts of that set is connected to terminal 57 and the other contact is connected to terminal 59.

The output 37-0 of Nand gate 23 is connected to the input 21-2 of the shift register. The second position output terminal 21-3 of the shift register is connected to the input of an inverter 45 in series with a resistor 42. The inverter is a conventional device, preferably including a semiconductor switching device. A capacitor 43 is connected between the input of the inverter and the source of +V, with the resistor and capacitor forming an integrating circuit. The output of the inverter 45 is connected to one of the inputs 25-4 of Nand gate 25.

The eighth position output terminal 21-5 of shift register 21 is connected to another inverter 49, which is likewise of conventional structure, and the output of inverter 49 is connected to one of the inputs 29-4 of Nand gate 29.

It is helpful to consider the relevant components of the conventional telephone substation to which this toll restricting circuit attachment is connected and this is schematically indicated in the figure by a telephone station represented by dash lines 60. The hookswitch contacts 61 of the telephone station is connected to input terminal 7 and hookswitch contact 62 is connected to terminal 9. The other end of one hookswitch is connected to the ground associated with the telephone line, not illustrated, and the other end of the second hookswitch is a source of negative 24 volts also over the telephone line.

The telephone substation contains a conventional digit selector mechanism such as the familiar Touch-Tone dial, not illustrated. As is known that mechanism includes a dial common contact which is closed during each operation of any of the ten pushbuttons on the digit selector and this is represented as switch contacts 63 in the figure. Switch 63 is electrically connected respectively to input terminals 6 and 8 of the toll restrictor circuit to form an electrical series circuit. The digit selector mechanism further includes a dial output contact circuit over which the Touch-Tone signals are transmitted over the telephone line to the central station. The installation of the toll restrictor requires that the dial circuit as shown in dash lines, be broken and the toll restrictor circuit is placed in series with the toll restrictor circuit contacts 39-1. Thus one lead of the dial circuit is connected to terminal 59 and the other to terminal 57 to form a series circuit with contact set 39-1 of relay 39. Lastly, the digit selector mechanism conventionally contains a "zero" digit switch 64, schematically illustrated. The zero switch is normally open and that is closed during the operation of the pushbutton representative of the digit "zero". The make contact of switch 64 is connected in circuit to terminal B, the movable contact is connected in circuit to terminal C and the output lead 65 is connected to terminal A. As is illustrated, the conventional circuit in the telephone set as represented by dash lines 66, between terminals A and B, is broken as part of the installation of the toll restrictor.

Before proceeding with the description of operation of the embodiment, it is helpful to review the terminology understood by those of ordinary skill in the art. It is common to describe the operation of electronic switching circuits in one syllable terms which would otherwise require more lengthy description. Thus when a transistor switching device is conducting electrical current through its collector, the transitor is said to be "on"; conversely when the transistor is not conducting current it is thus "off". Similarly when an input voltage or an output voltage to an element is at a high voltage level, relative to an arbitrary low voltage level, the element is said to be at a high. Conversely, where the element is at a low voltage, the element is at a low. Such voltages, both high and low, are employed or appear as control input and output signals in electronic switching circuits such as are used in the disclosed embodiment. Moreover the term "current" is used in the conventional sense, namely the movement of electrical charge from positive to negative polarity or from a high to a low.

Considering now the manner of operation of this embodiment, the party wishing to employ the telephone substation to dial a remote party removes the handset, not illustrated, from the telephone cradle, not illustrated. In so doing, the station is said to go "off-hook" and the hookswitch closes its contacts 61 and 62 to place circuit ground on terminal 7 and 24 volts on terminal 9. This completes a current conducting path through diode 11, resistor 13 and relay 3 to energize relay 3. Relay 3 operates and moves the transfer contact 5 into contact with the make contact. Circuit ground is thus connected through the make contact to one side of capacitor 19-3 of pulse generating circuit 19. Current through the resistor 19-2 charges capacitor 19-3 and creates a momentary voltage pulse in the circuit which is applied to the input of one-shot 19-5. The output of the trigger is a positive going voltage pulse appearing at output 19-10 which is coupled into the inverter transistor 19-12 and appears at the collector thereof as a negative going pulse.

The negative going pulse is applied to inputs 23-1 and 27-1 of Nand gates 23 and 27, respectively. The negative pulse at the input gate of Nand gate 23 results in changing the condition at the output 23-0 from a low to a high. This high voltage is applied to input 25-1 of Nand gate 25 which changes its output at 255 from a high to a low. This low voltage is in turn fed back from the output of Nand gate 25 to the second input of Nand gate 23 and serves to retain Nand gate 23 in the high condition and the circuit is essentially latched in this condition. This high output voltage at output 23-0 is applied also to input 21-2 of shift register 21 and is entered as an information bit in the first position of the shift register.

In like manner the negative going pulse applied to input 27-1 of Nand gate 27 serves to turn Nand gate 27 "off" so that its output at 27-0 goes from a low to a high condition. This high from the output of 27-0 is fed to input 29-1 of Nand gate 29 which thereupon has all of its inputs in the high condition resulting in the output at 29-5 switching from high to low. In turn this low is fed back to input 27-2 so as to cause Nand gate 27 to remain in the high condition. Hence the gates 27 and 29 are said to be latched in this condition.

The high output at 27-0 is also coupled to terminal 21-4 of the shift register to prepare the shift register for clearing one Nand gate 27 is switched back into its low condition as later occurs.

It is noted that the voltage from the source +V via resistor 31 is a high voltage which is fed to inputs 25-1 and 29-2.

With Nand gate 29 providing a low at output 29-0, relay R3 operates, current flows from source +V through relay winding 39 to output 29-0 to energize the relay and closes its contacts 39-1 which completes a circuit therethrough between terminals 57 and 59 to complete the dial output circuit over leads 67 and 69 to enable digit information to be transmitted from the substation.

Considering the first digit selected to be other than zero, the following sequence of events takes place. The depression of any digit selector button on the Touch-Type dial operates switch 63 which closes a circuit through circuit from ground via terminal 6, switch 63, terminal 8, to place the ground at one side of capacitor 15-3 in pulse generator 15. Capacitor 15-3 commences to charge through resistor 15-2 and generates a negative going pulse at the input 15-12 of the one-shot trigger pulse generator 15-4. The pulse generator operates in a conventional manner and supplies a properly shaped positive-going pulse at output 15-9 which is applied to clock input terminal 21-1 of shift register 21. Input pulses at the clock input of the shift register serve to "shift" the position of the bit of information entered therewithin. Thus the bit of information inserted at the input 21-2 into position "one" is shifted to position two in the shift register.

The foregoing process is repeated as further digits are selected. The "bit" of information initially entered into the shift register is sequentially shifted through the positions of the shift register in a well known manner and the position of the bit in the register is thus representative of a count of the number of digits dialed.

The first digit results in the shifting of the information entered at input 21-2 to the second position. As a result an output at the "second" position output 21-3 is provided by the shift register which is a pulse going from a high to a low condition. This pulse is coupled through resistor 42 to the input of inverter 45 and a negative going pulse appears at the output of the inverter. The negative going pulse is coupled into input 25-4 of gate 25. The negative pulse at Nand gate 25 causes the gate to change its condition since all of the inputs are no longer positive or high, essentially unlatching the gate. This results in resetting of both Nand gates 25 and 23 and thereupon the output of both is returned to a low.

With gate 23 now maintained at a low, no further information may be fed into the input 21-2 of the shift register.

As each additional digit is selected, the information bit shifts sequentially from position two to position three to position four, and so on within the shift register until position seven is reached. Conventionally a local number consists of seven digits and if the number of digits sent is only seven, no further action takes place within the circuit and the call is completed.

Upon completion of the call, the party using the telephone substation restores the telephone handset to the cradle and thereby opens the hookswitch 61 and 62 which interrupts current to relay 3. After a slight delay brought about by discharge of capacitor 14 through register 13 and the relay winding, relay 3 is de-energized and restores contact set 5 moving the transfer contact into contact with the break contact. Ground potential is applied to pulse circuit 16 at 16-4 which, as hereafter discussed in greater detail, will serve to reset the gate and latch circuits and indirectly reset shift register 21.

Thus ground applied to input 16-4 results in a pulse output at 16-5 and to inputs 25-3 of gate 25 and 29-3 of Nand gate 29. Gate 25 has previously been reset as heretofore described so that the low input is of no effect. Gate 29 now has a low at one input and is switched to its reset condition. The output of gate 29 switches to a high and de-energizes relay 39. Relay 39 restores to its normal unoperated condition and opens contacts 39-1. Gate 27 restores to its normal unoperated position resulting in output 27-0 going from a high to a low.

With the output of gate 27 at low and applied to the input 21-5 of the shift register, the shift register responds by clearing. All information or bits of information are shifted out of the register and the register is emptied to its normal condition and the circuit is restored to normal to await the next use of the telephone substation. Typically in a long distance call a total of ten digits are dialed. Hence one may select any of the eighth, ninth or tenth digits as the event used to disable further direct dialing.

Considering next an attempt to an eighth digit which would be the case if a long distance call were being placed in which the first three digits of the dialed number was the area code.

Reference may be made to the foregoing description for the operation of the circuit just prior to the dialing of an eighth digit. In this condition the shift register has shifted the information bit into position 7. The next operation of the selector mechanism again closes contact 63 to trigger pulse generator 15 and another pulse is applied to clock input 21-1 of the shift register to shift the bit into position 8.

The eighth position output of the shift register appears at 21-5 and is normally low. As the bit initially placed in position one is shifted into position eight by the dialing of an eighth digit, the output at 21-5 goes from a low to a high. This high is coupled to the input of inverter 49 and appears at the inverter output as a low voltage. This low is applied to input 29-4 of Nand gate 29. Nand gates 29 and 27 thereupon restore to normal in the same manner as occurred when the input at 29-2 was made negative and relay 39 is de-energized. Relay 39 restores to normal and opens its contacts 39-1. This opens the dial circuit of the telephone station 60 and prevents the further dialing of selected digits. Accordingly the party remains holding a telephone in his hand in which it is not possible for him to complete the sending of further digits and he must return the telephone to its cradle on the subset. In so doing, the circuits are restored to normal as in the preceding case inasmuch as relay 3 is restored to its normal condition returning transfer contact 5 to the break position which applies ground to input 17 of pulse generating circuit 16.

In the foregoing example the nth shift register output selected was eight with seven digits being representative of a non-toll call and any greater number being deemed a toll call. If, however, it is normal to have a five digit local call, then $n$, the selected output position, would be six in this specific embodiment. With other circuits it is possible for $n$ to represent the exact total of digits in a non-toll call. Then the change to a greater number is sensed as a toll call.

An additional feature of the disclosed embodiment is the circuit which prevents the party using the substation from dialing the telephone operator, inasmuch as one could seek to avoid dialing more than seven digits by simply calling the operator and asking her to place the telephone call.

Initially the calling party removes the telephone handset from its cradle; hookswitch contacts 61 and 62 operate; relay 3 is energized and operates its transfer contact 5 to ground the input of pulse generator 19. In turn, generator 19 pulses Nand gates 23 and 27 and Nand gates 23 and 27 switch to the on condition and Nand gates 25 and 29 latch the gates in that condition. Nand gate 23 pulses input 21-2 of the shift register to enter the bit of information represented by the voltage pulse into the register and relays 31 and 39 are energized via the respective outputs of Nand gates 25 and 29. Relay contact 39-1 closes to prepare the dial signal transmission path over lines 67 and 69 and transfer contact of contact set 31-1 moves into contact with the make contact thereof. The foregoing briefly summarizes the sequence of events leading up to the dialing of the first digit and which has been described heretofore in greater detail in connection with the initial description of operation.

Assume now that the digit zero is the first digit dialed. A positive voltage from source +V is then applied via terminal C of the dial zero contact 64, terminal B, through make contact 31-1 of relay 31, which is in its operated condition, to the base of transistor 33. Transistor 33, normally off, switches into its on or current conducting condition. In so doing, a circuit is completed to ground potential between the emitter and base electrodes and current passes from source +V, through resistor 31, through the transistor to ground.

Current through resistor 31 causes a "voltage drop" thereacross which reduces the voltage at input 29-6 and 25-2 of Nand gates 29 and 25 to a low voltage. This low causes the latched circuits of Nand gates 23 and 25 and Nand gates 27 and 29 to reset as in the preceding case, as described, and the shift register is automatically cleared as in the previous case.

Capacitors may be connected across the source 2 to shunt any sigificant high frequency noise to circuit ground.

As illustrated, the circuit allows an individual substation to which it is connected to be restricted from making toll calls, either by dialing direct more than seven numbers or by attempting to dial the operator.

It is understood that the foregoing example of a preferred embodiment of my invention as well as the method of restricting toll calls is intended to be illustrative of the invention and is not presented by way of limitation. As is apparent to one skilled in the art upon reading this specification, various modifications and substitutions of elements suggest themselves. This in respect to the elements of the disclosed embodiment, I characterize ground potential or "ground" as a source of low voltage or low and the positive voltage as a voltage high or high. Obviously, elements can be substituted having different electrical polarity characteristics, in which event ground will be the circuit high and the negative potential source voltage will be the low, and is thus fully equivalent in structure and function.

Accordingly, it is expressly understood that my invention is to be broadly construed within the full spirit and scope of the appended claims.

What I claim is:

1. A toll call restrictor for a telephone substation of the type containing:

a hookswitch, said hookswitch having an on-hook condition when said station is not in use and an off-hook condition when said station is in use;

digit selecting means for sending of digit representative signals from station, said digit selecting means including a plurality of digit selecting switches, one of which is representative of the number 0, a common switch operable in response to operation of each digit selecting switch, and a contact means operable in response to that one of said digit selecting switches representative of the number 0, and an electrical circuit associated with said digit selecting means for enabling coupling of signals from said digit selecting means to a telephone line, the invention comprising:

an electronic shift register, said shift register having a clock input for receiving pulses to shift the position of an information bit contained within the register, a clear input for clearing any bit from the register, a bit input for receiving and inserting an information bit into the register, and a series of outputs including:

a first position output;

an nth position output, where n represents a number greater than two;

first and second Nand gate means, each of said Nand gate means having an output connected in circuit to an input of the other Nand gate to form a first Nand gate latch means, said latch means having a first and a second condition of latching;

and wherein said first Nand gate means contains two inputs and an output;

and wherein said second Nand gate means contains four inputs and an output;

and means connecting the output of said first Nand gate means to the first input of said second Nand gate means; means connecting the output of said second Nand gate means to the second input of said first Nand gate means to form said first Nand gate latch;

third and fourth Nand gate means, each of said Nand gate means having an output connected in circuit to an input of the other Nand gate means to form a second Nand gate latch means, said latch means having a first and a second condition of latching;

and wherein said third Nand gate means contains two inputs and an output;

and wherein said fourth Nand gate means contains four inputs and an output;

and means connecting the output of said third Nand gate means to the first input of said second Nand gate means and means connecting the output of said fourth Nand gate means to the second input of said third Nand gate means to form said second Nand gate latch;

first means coupled to said Nand gate latches for setting said first and said second Nand gate latch means from a first into a second condition in response to said hookswitch being placed into the off-hook condition and responsive to said hookswitch being placed in an on-hook condition for setting both said first and second Nand gate latch means to the first condition;

said first means comprising:

a first relay, said relay having a winding and a set of transfer contacts including, a break contact, a make contact and a transfer contact, said transfer contact normally being in contact with said break contact and responsive to energization of said winding for moving into contact with said make contact;

means for coupling said relay winding in circuit with said hookswitch means for energizing said winding when said hookswitch is in the off-hook condition;

first pulse means having an input coupled to said make contact and an output responsive to said contact between said transfer and said make contact for generating a pulse at an output;

second pulse means having an input coupled to said break contact and an ouput responsive to the restoration of contact between said transfer contact and said break contact upon de-energization of said relay winding for generating a pulse at an output;

second means connecting the output of said first Nand gate latch means to the bit input of said shift register for inserting an information bit in the first position of said register responsive to said first Nand gate latch means being in the second condition;

third means responsive to said second Nand gate latch means being in the second condition for enabling said electrical circuit of said digit selecting means and responsive to said second Nand gate latch means being in the first condition for disabling said electrical circuit of said digit selecting means;

fourth means coupled in circuit with said clock input for providing an input pulse to said clock input responsive to each operation of said common switch in said digit selecting means to thereby shift any bit in said shift register a corresponding number of positions, representative of a count of digits;

fifth means responsive to an output at said first output of said shift register for setting said first Nand gate latch means in the first condition;

said fifth means comprising further:

an inverter having an input and an output;

means coupling the inverter input in circuit with the first position output of said shift register;

means coupling the inverter output in circuit with said fourth input of said second Nand gate means;

sixth means coupled to said second Nand gate latch means and to said nth position output of said first register for setting said second Nand gate latch means into the first condition in response to an output at said nth position output of said shift register;

said sixth means comprising further:

an inverter having an input and an output;

means coupling the inverter input in circuit with said nth position ouput of said shift register;

means coupling the inverter output in circuit with the fourth input of said fourth Nand gate means;

seventh means coupled to the output of said second Nand gate latch means for providing a signal to said clear input of said shift register in response to said second Nand gate latch means being placed in the first condition, whereby said shift register is cleared;

said seventh means comprising further:

electrical lead means connected between said output of said third Nand gate means and said shift register clear input;

eighth means responsive to a predetermined voltage at an input for setting both said first and second Nand gate latches to said respective first condition;

said eighth means comprising:

transistor switch means having an input and an output and electrical lead means connecting said input to a make contact of a second relay in a ninth means and electrical lead means connecting said transistor output for resetting said first and second Nand gate latches into the first condition;

ninth means responsive to said first Nand gate latch being in the second condition for coupling said first switch means input in circuit with said contact means associated with said "zero" switch while said first Nand gate latch means is in the second condition, whereby operation of said "0" digit selecting switch thereduring places a predetermined voltage at said contact means;

said ninth means comprising:

a second relay, said realy having a winding and a transfer contact and a make contact and responsive to energization of said winding for placing said transfer contact in contact with said make contact;

means connecting said winding of said relay means in circuit with the output of said first Nand gate latch, whereby when said Nand gate latch is in the second condition, said relay winding is energized;

electrical lead means coupling one of said relay contacts in circuit with said zero switch of said digit selecting means, whereby if zero is the first dialed digit, successive digits cannot be sent from the telephone set;

and wherein said first pulse means of said first means is coupled at an output to said Nand gate latches via electrical lead means connected to said first input of said first Nand gate means and to said first input of said third Nand gate means;

and wherein said second pulse means of said first means is coupled at an output to said Nand gate latches via electrical lead means connected to said third input of said second Nand gate means and to said third input of said fourth Nand gate means;

and wherein said electrical lead means connecting said transistor output of said eighth means to said Nand gate latches includes an electrical lead to a second input of said second Nand gate and an electrical lead to a second input of said fourth Nand gate;

and wherein said second means comprises further:

electrical lead means connected between said output of said first Nand gate means and said bit input of said shift register.

* * * * *